March 1, 1949.  D. MORR  2,463,295

PLATFORM FOR TRACTORS

Filed Dec. 17, 1945

INVENTOR.
Donald Morr
BY
Victor J. Evans & Co.
ATTORNEYS

Patented Mar. 1, 1949

2,463,295

UNITED STATES PATENT OFFICE 2,463,295

PLATFORM FOR TRACTORS

Donald Morr, Oakley, Ill.

Application December 17, 1945, Serial No. 635,505

2 Claims. (Cl. 280—165)

The invention relates to a tractor attachment and more especially to a platform attachment for tractors or the like.

The primary object of the invention is the provision of an attachment of this character, wherein the platform can be readily and conveniently applied to or removed from a tractor, and when applied functions as a step or stand board so that an operator of the tractor can ride the same at its rear with perfect safety or such rider can acquire the riding seat or leave the same in a convenient manner.

Another object of the invention is the provision of an attachment of this character, wherein the step or stand board is bracketed to the tractor in a novel manner, without liability of the same becoming accidently detached, and such step or board is adapted for one or both sides of the tractor with respect to its center line of draft.

A further object of the invention is the provision of an attachment of this character, which is simple in construction, thoroughly reliable and efficient in operation, strong, durable, easy of application or removal, possessed of few parts, thus economical in repairs or replacement of parts and inexpensive to manufacture and install.

With these and other objects in view the invention consists in the features of construction, combination and arrangement of parts as will be hereinafter more fully described, illustrated in the accompanying drawing, which discloses the preferred embodiment of the invention, and pointed out in the claims hereunto appended.

In the accompanying drawing.

Similar reference characters indicate corresponding parts throughout the several views in the drawing.

Figure 1:
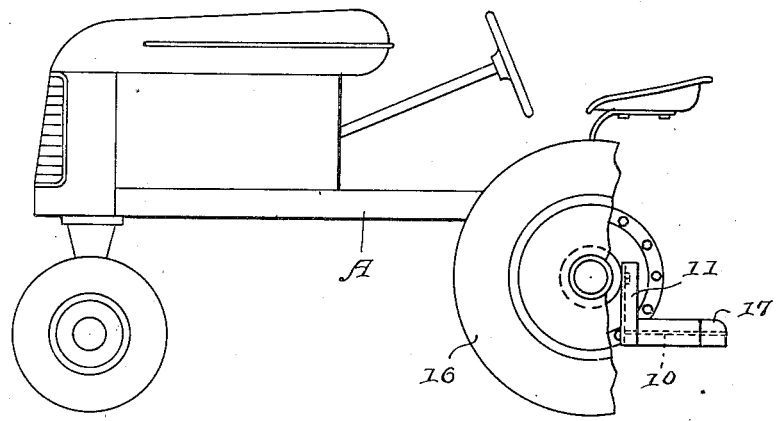
Figure 1 is a fragmentary side view of a tractor with the attachment constructed in accordance with the invention applied.

Referring to the drawing in detail, A designates generally a tractor, partly broken away in Figure 1, and is of any standard construction, for the appliction of the attachment constituting the present invention and hereinafter fully described.

The attachment constituting the present invention, comprises a flat tread plate 10, which is preferably made from rigid sheet metal, although it can be made from any other suitable material, having the required shape or contour, in this instance, its shape being elongated or substantially rectangular.

Figure 2:
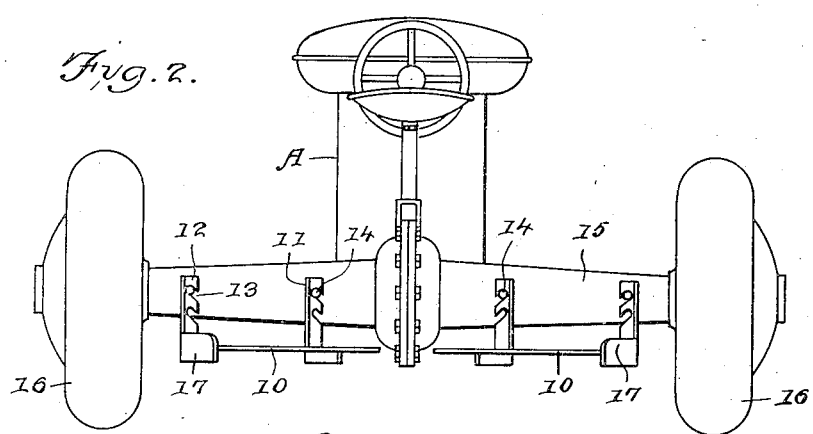
Figure 2 is a rear elevation.
Figure 3:
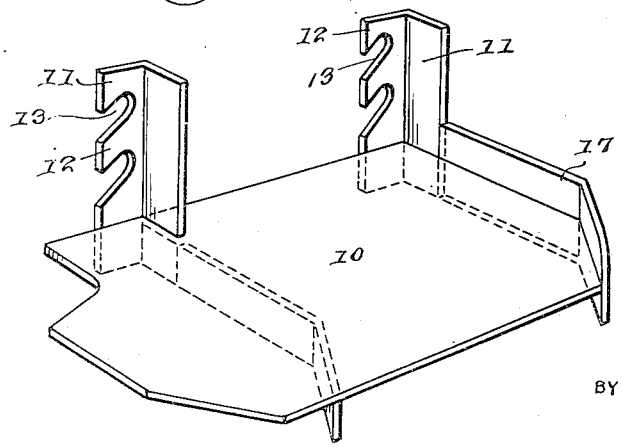
Figure 3 is a perspective view of one of the boards or steps.

Rising from this tread plate 10 at one longer edge thereof are spaced perpendicular hanger brackets 11, each of substantially L-shape in cross section, having in the flange 12 spaced downwardly inclined notches 13 selectively engageable with fasteners or headed bolts 14 carried on the differential axle housing 15 of the tractor A, as best seen in Figure 2 of the drawing, so that the attachment can be adjustably secured in place thereon to be used for a step or platform.

It is preferable to employ two steps or platforms, and each at its end edge next to a driving wheel 16 of the tractor A has unitary with the plate 10 a foot guard 17, which rises a distance above the upper face of such plate to eliminate the slipping of the foot of an operator of the tractor from this plate, with resultant injury by contacting the wheel 16 as should be obvious.

The platform plate 10 is supported in a load position horizontally at the rear of the tractor A, and at the desired height for the purpose of step use and also for the standing of such operator when operating the tractor.

What is claimed is:

1. In combination, a tractor having a transversely extending differential axle housing, laterally spaced headed bolts secured to the rear axle housing, a platform adapted to extend from said axle housing, a foot guard secured to said platform, said foot guard extending above said platform, hanger brackets substantially L-shaped in cross-section extending vertically from the forward edge of said platform, one of the sides of said hanger brackets being adapted to abut said axle housing when said platform is attached to said tractor, said hanger brackets having downwardly inclined notches adapted to receive the headed bolts of said axle housing and of a width slightly greater than the diameter of the headed bolts, the notches on both of said brackets extending in the same direction, and said bracket portions being provided with a plurality of notches on each hanger bracket, one above the other, whereby said platform can be vertically adjusted upon the tractor.

2. In combination, a tractor having a transversely extending differential axle housing, laterally spaced headed bolts secured to the rear axle housing, a platform adapted to extend from said axle housing, a foot guard secured to said platform, said foot guard extending above said platform, hanger brackets extending vertically from the forward edge of said platform and adapted to abut said axle housing when said platform is attached to said tractor, said hanger brackets having downwardly inclined notches adapted to receive the headed bolts of said axle housing, the notches on said brackets extending in the same direction, and said notches on each hanger bracket being arranged one above the other, whereby said platform can be vertically adjusted upon the tractor.

DONALD MORR.

REFERENCES CITED

The following references are of record in the file of this patent:

UNITED STATES PATENTS

| Number | Name | Date |
|---|---|---|
| 608,629 | Wood | Aug. 9, 1898 |
| 645,888 | Burns | Mar. 20, 1900 |
| 1,394,883 | Bernard | Oct. 25, 1921 |
| 1,534,647 | Kemmerling | Apr. 21, 1925 |
| 1,865,365 | Foote | June 28, 1932 |